Figure 1:
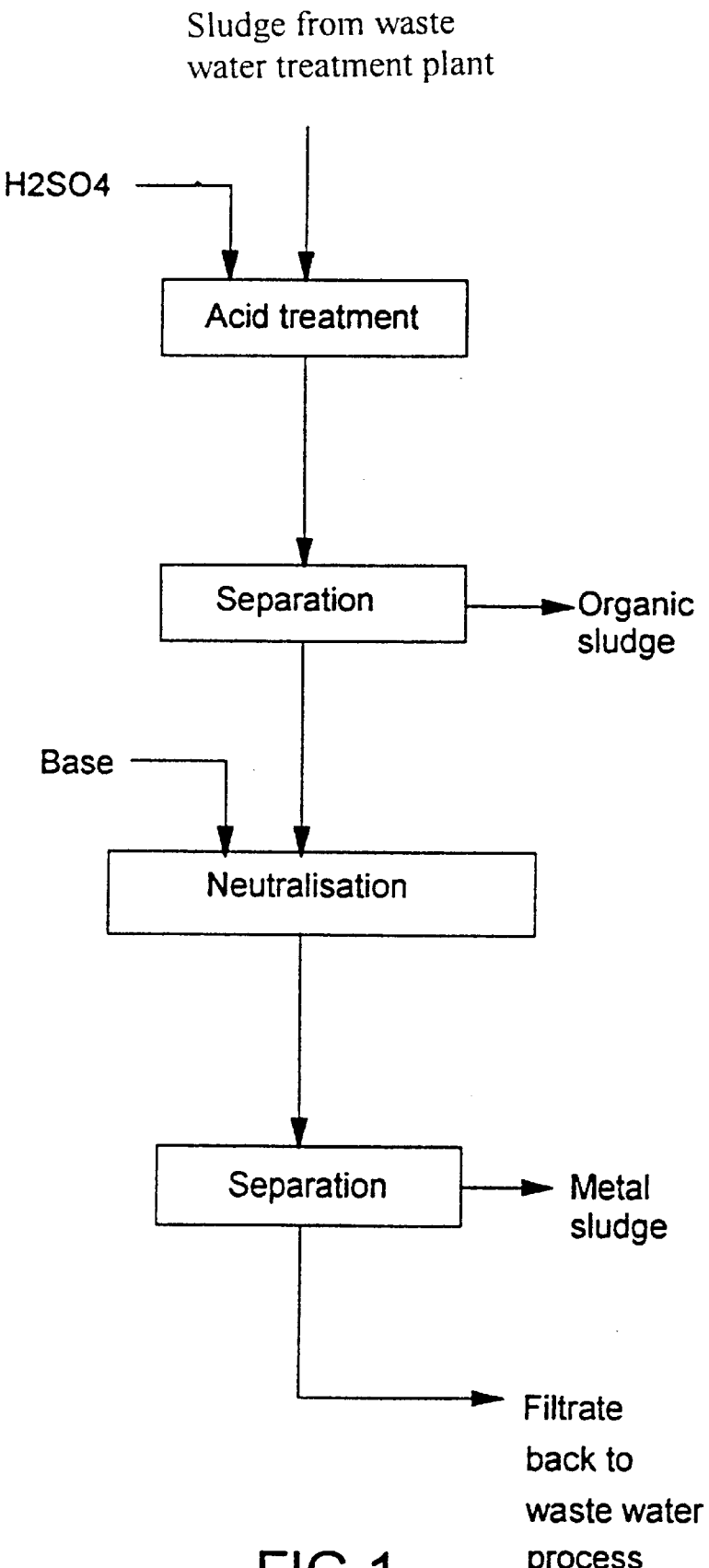

United States Patent

Jokinen

[11] Patent Number: 5,888,404
[45] Date of Patent: Mar. 30, 1999

[54] METHOD FOR TREATING WASTE WATER SLUDGE

[75] Inventor: Simo Jokinen, Oulu, Finland

[73] Assignee: Kemira Kemi Ab, Helsingborg, Sweden

[21] Appl. No.: 860,530

[22] PCT Filed: Dec. 29, 1995

[86] PCT No.: PCT/FI95/00717

§ 371 Date: Aug. 18, 1997

§ 102(e) Date: Aug. 18, 1997

[87] PCT Pub. No.: WO96/20894

PCT Pub. Date: Jul. 11, 1996

[30] Foreign Application Priority Data

Dec. 30, 1994 [FI] Finland ................................. 946190

[51] Int. Cl.⁶ ........................................................ C02F 1/64
[52] U.S. Cl. ........................ 210/711; 210/713; 210/722; 210/724; 210/726; 210/912; 210/913; 423/132; 423/150.3; 423/306
[58] Field of Search ................................. 210/609, 710, 210/711, 713, 721, 722, 724, 726, 912, 913; 423/132, 150.3, 305, 306

[56] References Cited

U.S. PATENT DOCUMENTS

| | | | |
|---|---|---|---|
| 4,671,882 | 6/1987 | Douglas et al. | 210/720 |
| 4,765,911 | 8/1988 | Rasmussen | 210/710 |
| 4,954,168 | 9/1990 | Crnojevich et al. | 423/55 |

FOREIGN PATENT DOCUMENTS

| | | |
|---|---|---|
| 072885 | 3/1983 | European Pat. Off. . |
| 377766 | 7/1990 | European Pat. Off. . |
| 152648 | 7/1985 | Norway . |
| 154010 | 3/1986 | Norway . |
| WO 95/06004 | 3/1995 | WIPO . |

OTHER PUBLICATIONS

Scott et al., Enviro. Sci. & Tech. 9:849–855 (1975).
Wilhelm et al., Chemical Abstracts 109:338 (134448e) (1988).

*Primary Examiner*—Peter A. Hruskoci
*Attorney, Agent, or Firm*—Klauber & Jackson

[57] ABSTRACT

The invention relates to a method for treating waste water sludge comprising at least one metal originating from a waste water treatment coagulant, and phosphorus and heavy metals in order to recover said at least one metal and phosphorus and to discharge said heavy metals. In this method said waste water sludge is acidified to dissolve metals contained in the sludge thereby yielding an acidified sludge solution containing at least 1% by weight of at least one metal to be recovered. In a first precipitation stage the pH of said acidified sludge solution is raised to precipitate at least one metal to be recovered as a phosphate, and thereafter the phosphate precipitate is separated, thereby leaving a solution comprising heavy metals. In a second precipitation stage the pH of said solution comprising heavy metals is raised and, if necessary, an appropriate chemical is added to precipitate heavy metals, and thereafter the precipitate is discharged.

21 Claims, 6 Drawing Sheets

METHOD FOR TREATING WASTE WATER SLUDGE

This application is a 371 of PCT/FI95/00717 filed Dec. 29, 1995, and claims priority thereof.

The invention relates to a method for treating waste water sludge comprising at least one metal, especially iron and possibly aluminium, originating from a waste water treatment coagulant, and phosphorus and heavy metals in order to recover said at least one metal and phosphorus and to discharge said heavy metals. In particular, the sludge is from a waste water purification process where waste water is chemically-precipitated i.e. by using coagulants containing iron and possibly aluminium.

Dumping of the waste water sludge from a waste water purification plant is a major problem. This is partly due to the heavy metal content of the sludge. It is difficult to find suitable places for the waste and as standards rise landfilling is becoming more and more expensive. From this perspective the idea of recycling the waste water sludge is becoming increasingly important. Recycling involves treatment of the sludge to recover coagulant chemicals, particularly iron and aluminium, used in the water purification plant, and phosphorus.

The first stage in a waste water purification process of the above kind is precipitation using Fe and possibly Al chemicals and sedimentation which yield a chemical sludge i.e. the precipitation sludge. One possible treatment procedure is first to dewater the sludge to a dry solids content of 15–25% and then to compost, incinerate or transport the dewatered sludge to a dump.

Another possible procedure is to acidify the precipitation sludge to dissolve metals. Insoluble substances are removed by filtering. The dissolved metals and phosphorus in the filtrate are precipitated and a sludge, which will be called a metal sludge, is obtained. The metal sludge contains the iron and aluminium of the used coagulant and, in addition, phosphorus and heavy metals. The procedure can also be performed at an elevated temperature to improve the filterability i.e. the dewatering properties of the sludge. The sludge to be treated can be a pre-precipitation sludge, a simultaneous precipitation sludge, post-precipitation sludge or a mixture thereof.

One additional alternative for treating the sludge is hydrolysis where the purpose is to hydrolyse organic material of the sludge into short-chained compounds to be utilized in later stages of the waste water treatment process, especially as carbon source in the denitrification stage. During hydrolysis, the metals of the raw sludge dissolve in the hydrolysate solution. In the so-called thermal acid hydrolysis the temperature is 150°–160° C., and pH<2, preferably 1–1.5. After the hydrolysis, the insoluble part i.e. the organic sludge is separated, the sludge containing primarily fibres and possibly insoluble silicate minerals. The pH of the obtained solution is raised above the neutral level using a base so that the dissolved metals precipitate as hydroxides and phosphates. The precipitated sludge, which will hereinafter be called metal sludge is then separated. The metal sludge contains iron and aluminium and also phosphorus and heavy metals.

The metal sludge can be dissolved in sulphuric acid or possibly in hydrochloric acid and the insoluble substances can be separated by filtering.

Acidification nor hydrolysis of sludge is not commonly used in waste water purification. One reason is poor profitability. An additional problem is the metal sludge, which has no use. The metal sludge contains heavy metals, which makes the sludge a harmful waste for the environment.

The applicant has earlier proposed (PCT/FI94/00376) a method for recovering the coagulants and phosphorus from the acidic filtrate obtained by dissolving metal sludge in sulphuric acid. The acidic filtrate typically contains at least 1% by weight of Fe. This method involves an extraction step, in which Fe and Al are separated, followed by two successive precipitation stages for separating heavy metals and phosphorus. Although this process has given promising results so far, extraction may turn out to be problematic for several reasons. Use of organic solvents is expensive. Also the extraction process contains several steps, which makes the process difficult to control. Clean solutions are required and therefore the organic impurities in the solution must be removed before the extraction step. It has also been found that an extra polishing precipitation may be needed after the extraction step to remove the remaining Fe from the solution. An inherent problem in extraction, particularly in the stripping stage, is that the solutions must have a relatively low concentration of Fe. Extraction is not an effective method for concentrated Fe solution.

Scott and Horlings have studied the removal of phosphates and metals from sewage sludges (Environmental Science & Technology, vol. 9, no. 9, 1975, pp. 849–855). Most of the metals and phosphorus in anaerobically digested sludges can be extracted by acid. The acid extract is neutralized to yield a solid product low in organic material containing mostly iron and aluminium phosphates. By proper control of pH, it is possible to produce two solid products, one containing most of the iron and aluminium and one containing most of the heavy metals. The above method cannot be used as such for a metal sludge, which typically has a much higher concentration of iron (and/or aluminium). Selective precipitation works fine in dilute solutions but in concentrated solutions there is a considerable overlap of the pH ranges at which various metals precipitate. Therefore, if the above method were applied to a typical metal sludge, the solid product containing Fe would also contain a considerable amount of heavy metals. The product could not be used as a raw material for coagulant chemicals.

The objective of this invention is to provide a workable process, which solves the sludge problem in a waste water purification plant. The process must be able to remove coagulant metals from solutions with relatively high concentration of iron and possibly aluminium. This objective can be achieved by the present invention, which provides a method for treating waste water sludge comprising at least one metal originating from a waste water treatment coagulant, and phosphorus and heavy metals in order to recover said at least one metal and phosphorus and to discharge said heavy metals, wherein said waste water sludge is acidified to dissolve metals contained in the sludge, thereby yielding an acidified sludge solution containing at least 1% by weight of at least one metal to be recovered, said method being primarily characterized in that it comprises a first precipitation stage comprising raising the pH of the acidified sludge solution and, if necessary, adding phosphate to precipitate at least one metal to be recovered as a phosphate, and thereafter separating the phosphate precipitate, thereby leaving a solution comprising heavy metals, and a second precipitation stage comprising raising the pH of said solution comprising heavy metals and, if necessary, adding an appropriate chemical to precipitate heavy metals, and thereafter discharging the precipitate.

The term "heavy metal" denotes metals of the following group: Cr, Ni, Cu, Zn, Cd, Pb and Hg.

Preferably, the waste water sludge to be treated with the method of the present invention comprises metal sludge obtained by subjecting waste water sludge from a waste water treatment plant to acid treatment followed by precipitation and separation of metal sludge from the filtrate. The acidified sludge solution obtained by dissolving metal sludge in an acid typically contains at least 1% and up to 6% by weight of each individual coagulant metal.

The method of the invention is an obvious improvement compared to the method which is based on extraction. Iron and phosphorus is first precipitated as ferric phosphate. This precipitate is processed in the subsequent process steps to produce a ferric coagulant and a phosphate product. A preferred method of the invention is based on the following three conditions: (a) the precipitation is performed at a sufficiently low pH to provide pure product free of heavy metals, (b) Fe:P ratio is adjusted prior to precipitation and (c) a polishing precipitation of the coagulant metal phosphate is performed after the above precipitation. The method is suitable for solutions with relatively high concentration of metals and phosphorus.

Heavy metals of the metal sludge are separated by precipitation. The amount of the precipitate containing heavy metals is small so that dumping of the sludge is easier so that it does not cause any harm to environment.

Preferably, the waste water sludge is prior to the first precipitation stage treated with an oxidizer, such as hydrogen peroxide, to convert divalent iron to trivalent iron.

According to a preferred embodiment, the molar ratio of the metal or metals to be recovered to phosphate is adjusted prior to the first precipitation stage by adding phosphoric acid to the dissolution stage, wherein the waste water sludge is acidified or alternatively said molar ratio is adjusted prior to or during the first precipitation stage by adding a phosphate solution obtained from a later stage of the process. Said molar ratio is preferably adjusted to about 1:1.

The solution obtained in the first precipitation stage can, prior to the second precipitation stage, be subjected to a further precipitation by raising the pH to precipitate a further portion of at least one metal to be recovered as a phosphate.

This phosphate precipitate can after separation be introduced into the dissolution stage, wherein the waste water sludge is acidified.

According to one embodiment the pH in the first precipitation stage is raised to about 2 to 3 to precipitate ferric phosphate. The separated ferric phosphate precipitate can be treated with an alkali hydroxide, such as sodium hydroxide, thereby forming insoluble ferric hydroxide and a solution comprising soluble alkali phosphate, whereafter the ferric hydroxide is separated.

According to an other embodiment the pH in the first precipitation stage is raised to about 3 to 4 to precipitate ferric and aluminium phosphates. The separated ferric and aluminium phosphate precipitate can be treated with an alkali hydroxide, such as sodium hydroxide, thereby forming insoluble ferric hydroxide and a solution comprising soluble alkali phosphate and aluminium hydroxide, whereafter the ferrichydroxide is separated.

The above separated ferric hydroxide, optionally after a treatment with an alkali can be dissolved in hydrochloric acid to yield a ferric chloride solution or in sulphuric acid to yield a ferric sulphate solution or in nitric acid to yield a ferric nitrate solution. These solutions are useful as coagulant chemicals.

The above solution comprising soluble alkali phosphate can be subjected to a treatment to precipitate alkali phosphate, whereafter the precipitated alkali phosphate is separated, thereby leaving a solution comprising phosphate. Said phosphate solution can be used to adjust the molar ratio of the metal or metals to be recovered to phosphate prior to or during the first precipitation stage.

An alkaline earth metal hydroxide, such as calcium hydroxide, can be added to the above solution comprising soluble alkali phosphate and aluminium hydroxide to precipitate an alkaline earth metal phosphate complex, such as $Ca_5(OH)(PO_4)_3$, whereafter the precipitate is separated, thereby leaving a solution comprising an alkali aluminate. An acid, such as sulphuric acid, can be added to said solution comprising alkali alumninate to lower the pH to a level, preferably between about 7 and 8, whereat aluminium hydroxide precipitates, whereafter the precipitate is separated.

Preferably the second precipitation stage is carried out at a pH of about 7 to 9 in the presence of a heavy metal binder, such as hydrogen sulphide or a sulphide, e.g. sodium sulphide, sodium hydrogen sulphide or ferrous sulphide. If aluminium is present in the second precipitation stage it co-precipitates with the heavy metals.

The base used to raise the pH in the first and second precipitation stages is for example an alkali hydroxide, such as NaOH, ammonia or a magnesium or calcium compound, such as MgO, $Mg(OH)_2$, CaO or $Ca(OH)_2$.

Figure 2:
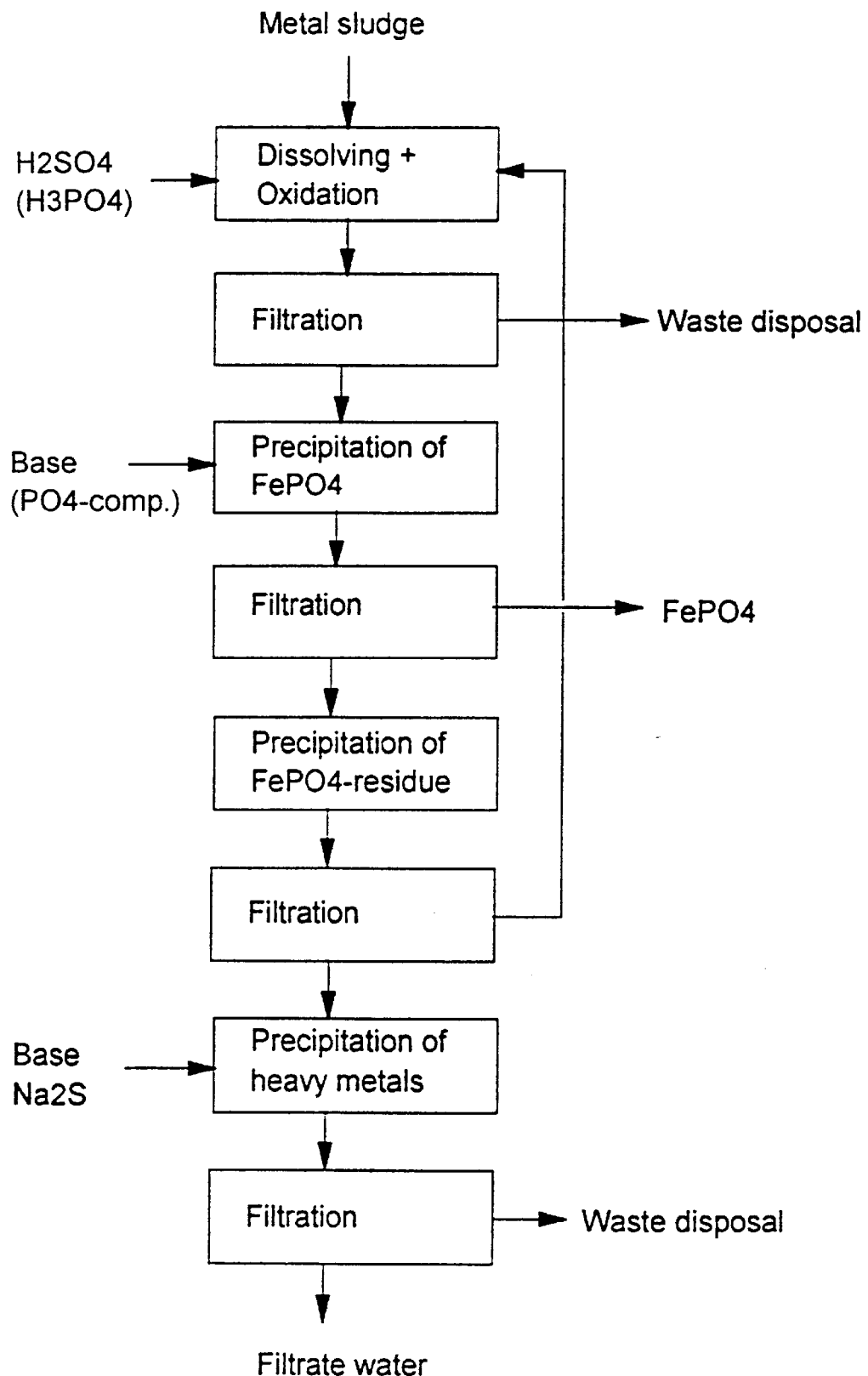
Figure 3:
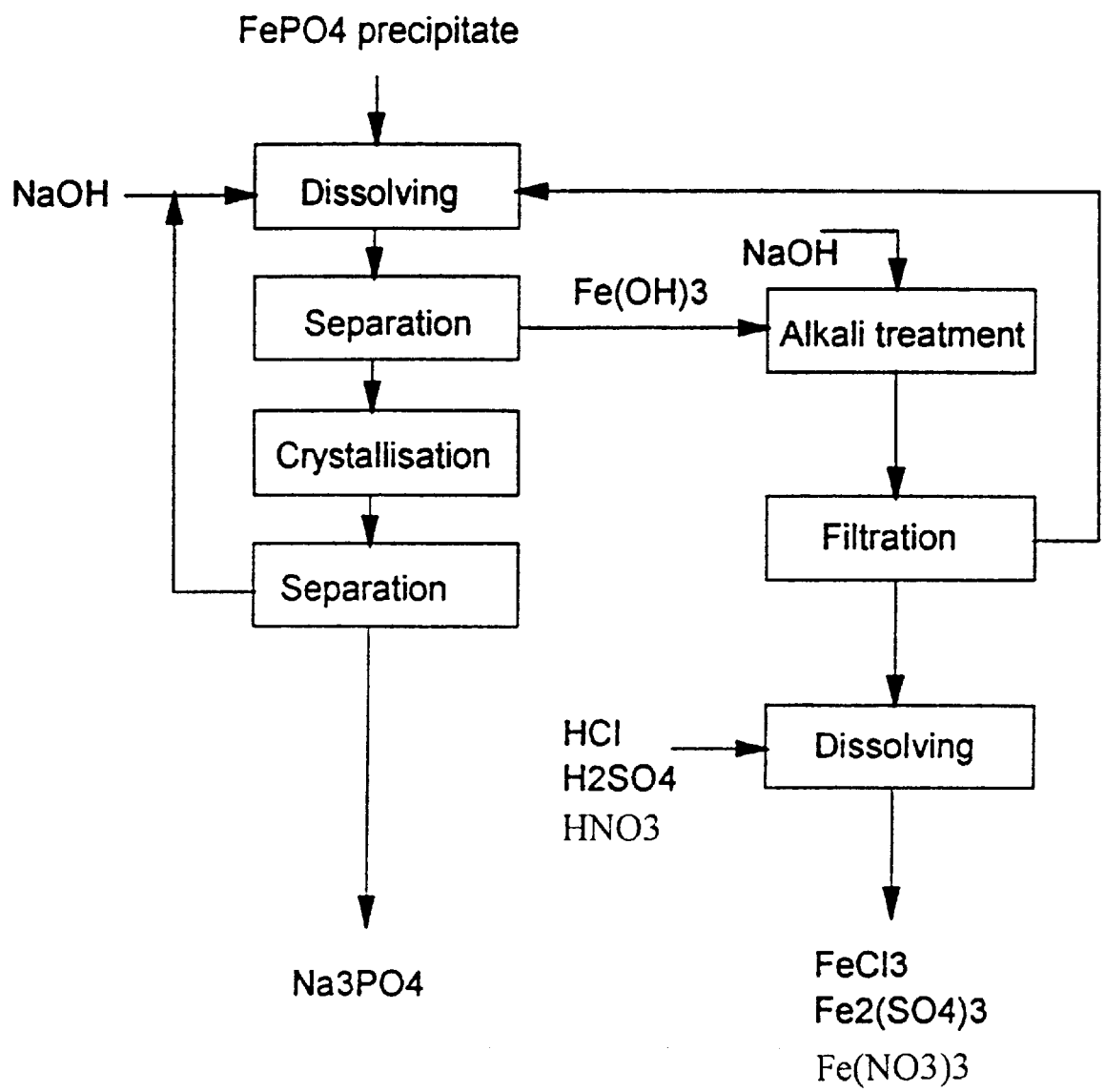
Figure 4:
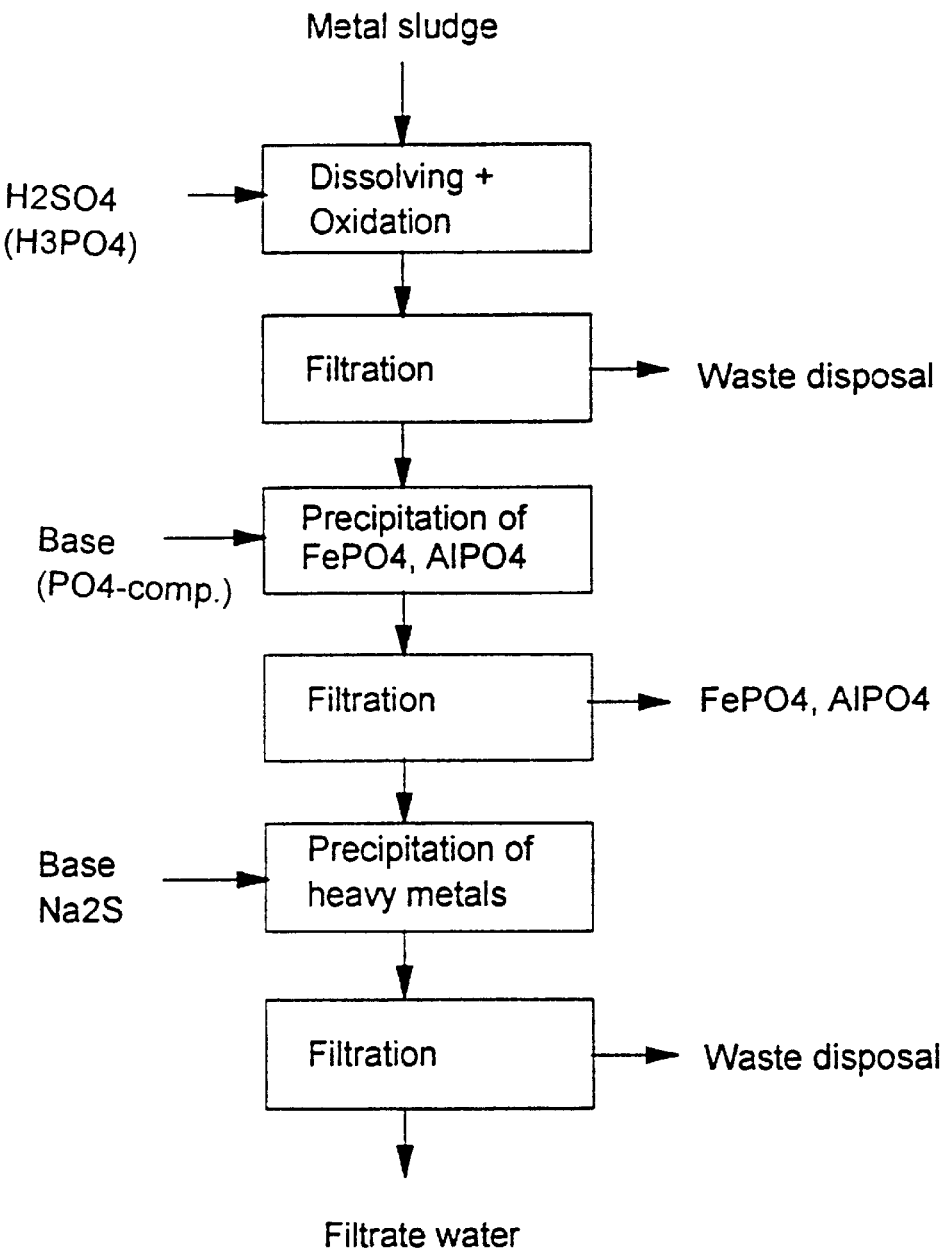
Figure 5:
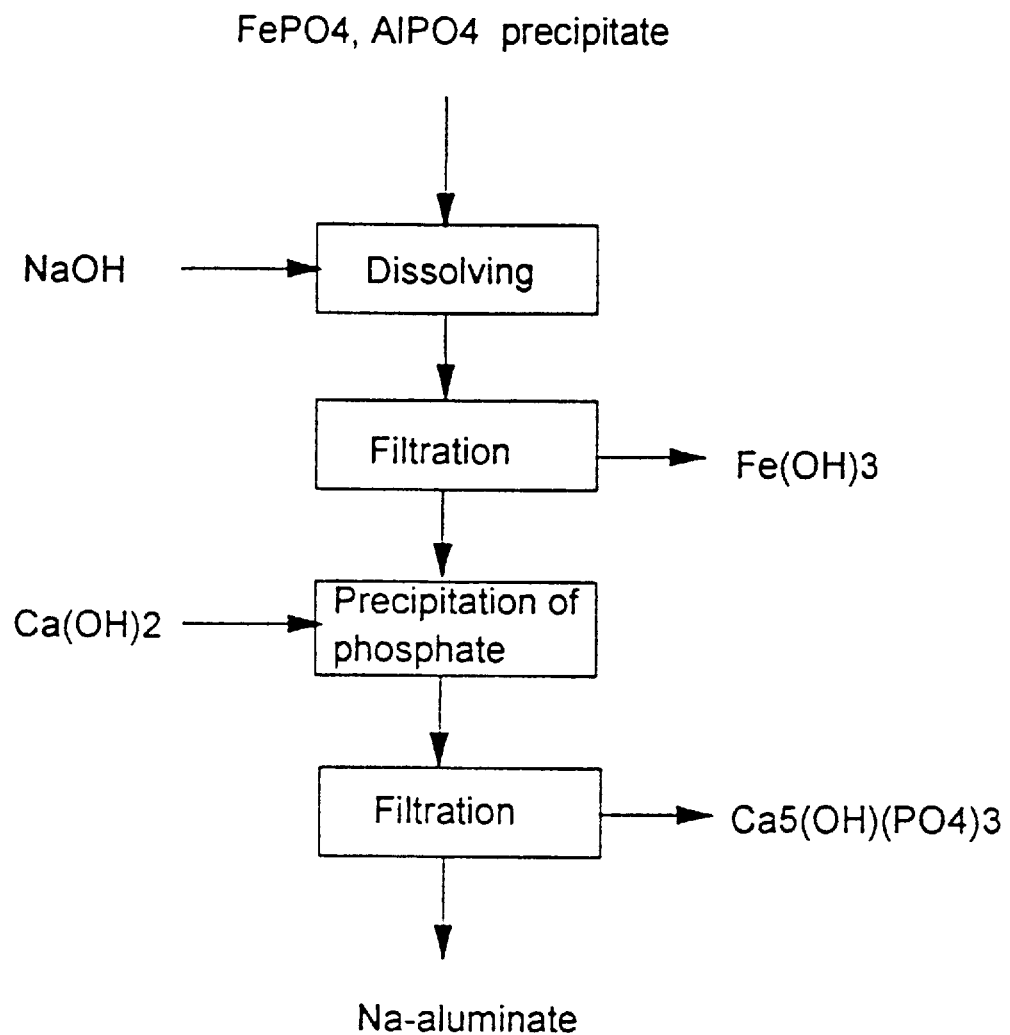
Figure 6:
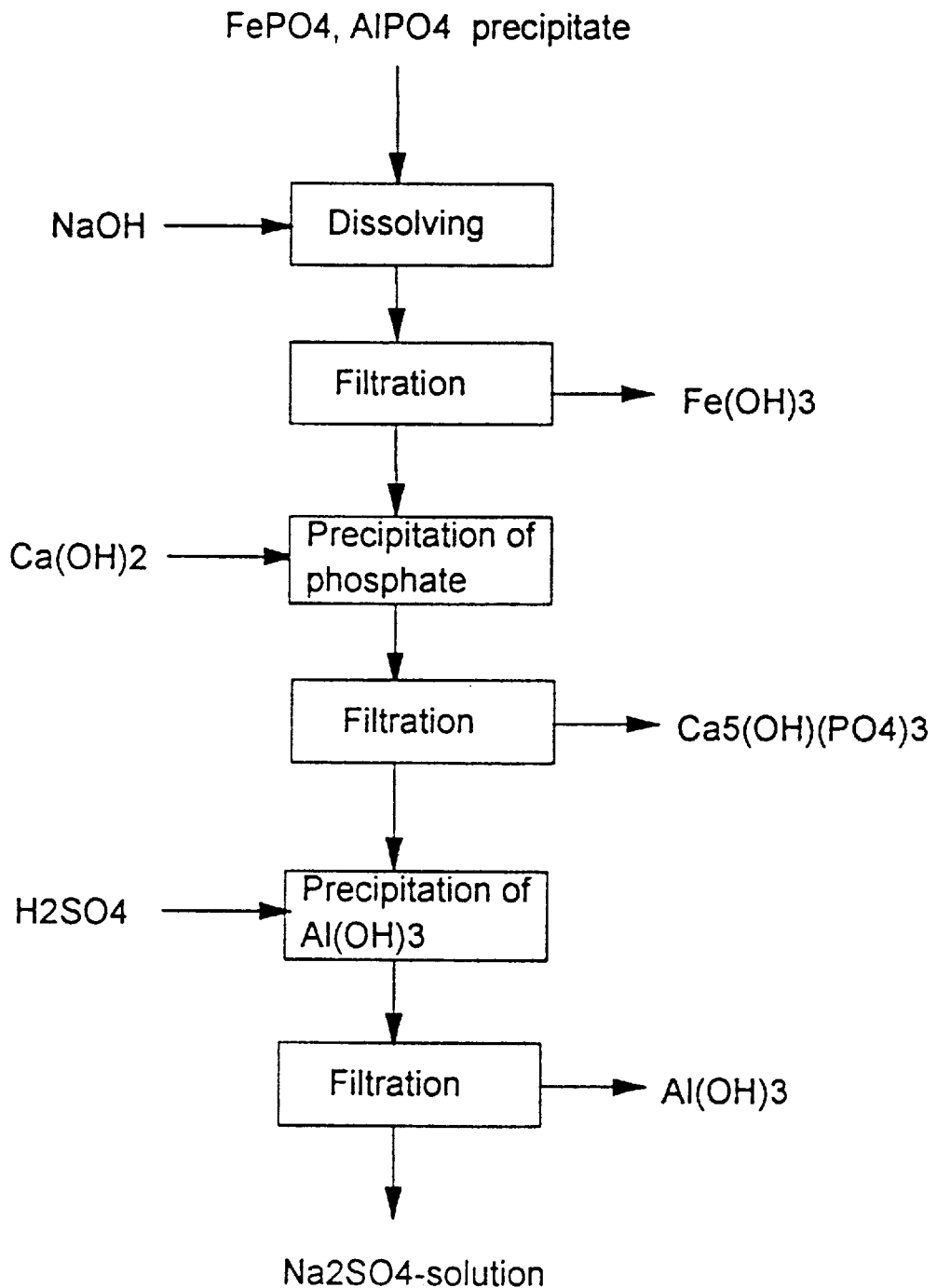

The invention is described in more details in the following referring to the enclosed drawings in which FIG. 1 shows an acidification process of precipitated sludge as a block diagram, FIG. 2 shows a method according to the invention for treating a metal sludge obtained from a waste water sludge as a block diagram, FIG. 3 shows the method for processing the ferric phosphate precipitate, FIG. 4 shows an alternative method for treating a metal sludge, FIG. 5 shows a first alternative method for treating the precipitate from the process of FIG. 4, and FIG. 6 shows a second alternative method for treating the precipitate from the process of FIG. 4.

FIG. 1 shows diagrammatically processing of a sludge from a waste water treatment plant. The metals in the sludge dissolve in the solution during acidification. The insoluble part i.e. the organic sludge is separated, the organic sludge containing primarily fibres and possibly insoluble silicate minerals. For neutralizing the solution and precipitation of metals e.g. lime is added to the solution. In the separation stage subsequent to the neutralization stage, the metal sludge is separated. The filtrate is led to later stages of the waste water treatment process.

According to FIG. 2 the metal sludge is dissolved in sulphuric acid or possibly in hydrochloric acid in the dissolving stage. Hydrogen peroxide or an other oxidation agent is added to make sure that iron is in ferric form. If the oxidation agent has been added in some prior stage its addition is not necessary at this stage. It may be necessary to add phosphoric acid to adjust the $Fe:PO_4$ mole ratio to 1.0. Addition of phosphoric acid reduces the need of sulphuric or hydrochloric acid.

After dissolution, the remaining insoluble substances are separated by filtering and disposed of. The filtrate contains Fe-phosphate/chloride/sulphate depending on the acids used in the dissolution stage. The filtrate naturally contains dissolved heavy metals and other soluble impurities. Instead of filtering other separation methods like centrifugation can be used as well.

In the first precipitation stage, a base like NaOH or $NH_3$ or a Mg/Ca compound is added to the acidic solution and pH is adjusted to about 2 whereat pure $FePO_4$ precipitates. The $PO_4^{3-}$ addition for adjusting the mole ratio to 1 can also take place at this stage by adding $Na_3PO_4$ solution, which is one end product of this process. The pH regulation is important because at higher pH values heavy metals may co-precipitate and reduce the purity of the product. The precipitate ($FePO_4$) obtained is separated from the solution and conveyed to further process stages, which will be described later.

If the acidic filtrate contains Al and it is desired to separate the same from the solution, this can be carried out by raising the pH by 1–2 units i.e. to pH values 3–4, whereat $AlPO_4$ precipitates.

The pH of the filtrate solution is raised to about 3 to precipitate the remaining $FePO_4$. The purpose of this second precipitation of $FePO_4$ is to minimize $FePO_4$ losses and thereby improve the yield of the process. The precipitate is returned to the beginning of the process and combined with the metal sludge.

The final stage in the treatment process is the precipitation of heavy metals and aluminium. Sodium sulphide is added to the solution and pH is gradually raised to about 7–9. The pH is raised by using a base like NaOH, $NH_3$, $Ca(OH)_2$, etc. It is also possible to use other known heavy metal binders to make precipitation more efficient and to ensure very low concentration of heavy metals in the filtrate. The precipitate containing sulphides and hydroxides of heavy metals and aluminium is separated from the solution. The volume of this harmful solid waste is small and it can be stored in a safe place. The filtrate water is returned to recycle.

FIG. 3 shows the processing of the $FePO_4$ precipitate. The $FePO_4$ precipitate is first dissolved at pH 12 and 60° C. The pH is adjusted with NaOH. At this pH $FePO_4$ dissolves and the ferric iron precipitates as $Fe(OH)_3$. The solution is filtrated to separate the hydroxide precipitate from the liquid phase, which contains $Na_3PO_4$ in soluble form. On cooling the solution, $Na_3PO_4$ forms crystals, which are separated from the solution to yield a very pure phosphate product for use as a raw material in detergent industry, for example. The basic solution is returned to the beginning of the process i.e. to the stage, in which the $FePO_4$ precipitate is dissolved in NaOH.

The $Fe(OH)_3$ precipitate can be further treated with alkali as shown in FIG. 3. NaOH is added to the precipitate and the $Fe(OH)_3$ precipitate is filtered. The purpose of this alkali treatment is to remove any remaining phosphorus from the precipitate. The alkali filtrate is returned to the beginning of the $FePO_4$ process. The ferric hydroxide precipitate is dissolved in hydrochloric acid to yield a $FeCl_3$ solution or in sulphuric acid to yield a $Fe_2(SO_4)_3$-solution. Both of these alternative solutions can be used as a coagulant chemical in a water purification plant. It is also possible to use nitric acid. Ferric nitrate can be used in special situations wherein nitrogen or oxygen of the nitrate is needed.

FIG. 4 shows the method of the invention in case the sludge contains a significant amount of aluminium. Precipitation of $FePO_4$ and $AlPO_4$ take place simultaneously at the pH range 3–4. The precipitate is separated by filtering, the filtrate containing heavy metals. Since all $FePO_4$ is likely to precipitate at this pH, no additional precipitation stage is needed as in FIG. 2. Therefore, the filtrate goes to the subsequent step for precipitation of heavy metals from the solution. Sodium sulphide is added to the solution and pH is gradually raised to about 7–9. The pH is raised by using a base like NaOH, $NH_3$, $Ca(OH)_2$, etc. It is also possible to use other known heavy metal binders to make precipitation more efficient and to ensure very low concentration of heavy metals in the filtrate. The precipitate containing sulphides and hydroxides of heavy metal is separated from the solution. The filtrate water can be recycled in the process.

FIG. 5 shows a first alternative for further treating the precipitate, which contains both $FePO_4$ and $AlPO_4$ to recover Al, Fe, and phosphorus. The precipitate is first dissolved at pH 12 and 60° C. The pH is adjusted with NaOH. At this pH, $FePO_4$ and $AlPO_4$ dissolve and the ferric iron precipitates as $Fe(OH)_3$, whereas Al remains in the solution. The solution is filtrated to separate the hydroxide precipitate from the liquid phase, which contains aluminium and $Na_3PO_4$ in soluble form. Adding $Ca(OH)_2$ to this solution results in precipitation of calcium phosphate in the form of $Ca_5(OH)(PO_4)_3$, which is separated from the solution in the subsequent filtration step. The filtrate, which contains sodium aluminate, can be used as such or it can be further processed in a manner shown in FIG. 6.

FIG. 6 shows a second alternative for further treating the precipitate, which contains both $FePO_4$ and $AlPO_4$ to recover Al, Fe, and phosphorus. This alternative is the same as that of FIG. 5 except that sulphuric acid is added to the filtrate solution containing alumininum in soluble form to lower pH to about 7–8. At this pH, $Al(OH)_3$ precipitates. The precipitate is separated by filtration, and it can be used as raw material for an Al-coagulant. The filtrate contains mainly $Na_2SO_4$.

EXAMPLE 1.

Metal sludge was acidified and filtrated. A volume of 3 litres of the filtrate was taken for further tests. To oxidize all Fe into ferric form, 60 ml of $H_2O_2$ was added in small amounts while mixing the batch on a magnetic mixer. $H_3PO_4$ was added to adjust the mole ratio P:Fe to 1. Table 2 shows the chemical analysis of the acidic filtrate before the addition of P.

TABLE 1

Conditions during precipitation and filtration. The precipitate was washed twice. The weight of solid precipitate is the weight of the wet cake.

| Test | Precipitation pH | °C. | min | Wash water ml | Solid g | Filtrate g |
|---|---|---|---|---|---|---|
| 1 | 2.5 | 60 | 60 | 2*100 | 104 | 632 |
| 2 | 2.8 | 60 | 60 | 2*90 | 78 | 486 |
| 3 | 2.5 | 23 | 60 | 2*90 | 107 | 473 |
| 4 | 2.3 | 60 | 60 | 2*90 | 82 | 438 |
| 5 | 2.0 | 23 | 30 | 2*100 | 141 | 621 |
| 6 | 2.0 | 23 | 30 | 2*100 | 126 | 654 |

Six precipitation tests (1 ... 6) were made using the above filtrate with the exception that in test 6 the mole ratio P:Fe was intentionally adjusted to 0.8. The tests were performed in the following way. A 500 ml volume of the filtrate was heated to the desired temperature (see Table 1). While heating the batch, NaOH was gradually added to adjust the pH to the desired value. After reaching the intended temperature and pH, mixing was continued for 1 h. The solution was then filtered (Buchnerfilter) and washed with water twice. The wash water was added to the filtrate, which was then analyzed. The analytical results are presented in Table 2.

The precipitation yields are presented in Table 3. The results show clearly that $Fe^{3+}$ precipitates well as $FePO_4$ in the pH range 2–2.5. Cr and Al co-precipitate less at lower pH.

TABLE 2

Chemical analysis of the oxidized acidic filtrate (second column) and the filtrate obtained after the precipitation of $FePO_4$ in tests 1–6.

|        | Filtr  | 1      | 2      | 3      | 4      | 5      | 6      |
|--------|--------|--------|--------|--------|--------|--------|--------|
| Fe(%)  | 1.9    | 0.12   | 0.10   | 0.093  | 0.12   | 0.21   | 0.22   |
| $Fe^{3+}$(%) | 1.8 | 0.01   | 0.01   | 0.01   | 0.01   | 0.06   | 0.11   |
| P(%)   | 0.38   | 0.02   | 0.01   | 0.01   | 0.01   | 0.05   | 0.05   |
| Al(%)  | 0.17   | 0.055  | 0.026  | 0.040  | 0.036  | 0.10   | 0.12   |
| Ca(%)  | 0.061  | 0.045  | 0.041  | 0.043  | 0.044  | 0.048  | 0.047  |
| Mg(%)  | 0.078  | —      | —      | —      | —      | —      | —      |
| Cr(ppm)| 7.3    | 2.7    | 1.5    | 3.0    | 2.2    | 4.0    | 3.8    |
| Ni(ppm)| <2     | —      | —      | —      | —      | —      | <2     |
| Cu(ppm)| 8.6    | —      | —      | —      | —      | —      | 6.4    |
| Zn(ppm)| 95     | —      | —      | —      | —      | —      | 72     |
| Cd(ppm)| <0.3   | —      | —      | —      | —      | —      | <0.3   |
| Pb(ppm)| 2.8    | —      | —      | —      | —      | —      | <2     |
| TOC(%) | 0.30   | 0.10   | 0.09   | 0.09   | 0.10   | 0.12   | 0.10   |
| pH     | 0.7    | 2.5*)  | 2.8*)  | 2.5*)  | 2.3*)  | 2.0*)  | 2.0    |

*)pH in precipitation

TABLE 3

Precipitation yield in tests 1–6.

| | Yield-% | | | Co-precipitated with $FePO_4$ | | | |
|---|---|---|---|---|---|---|---|
| | Tot | | | % | | | |
| Test | Fe | $Fe^{3+}$ | P | Al | Ca | Cr | TOC |
| 1 | 92 | 99 | 98 | 59 | 7  | 53 | 58 |
| 2 | 93 | 99 | 99 | 79 | 9  | 72 | 59 |
| 3 | 93 | 99 | 99 | 69 | 6  | 45 | 60 |
| 4 | 92 | 99 | 99 | 74 | 11 | 63 | 59 |
| 5 | 86 | 96 | 94 | 27 | 2  | 32 | 50 |
| 6 | 85 | 92 | 92 | 8  | 0  | 32 | 56 |

The yield values in Table 3 show that almost a complete recovery of Fe and P was in tests 1–4.

The filtrate of test 6 was processed further. A precipitate had formed in the filtrate. The filtrate with the precipitate was filtered with a fibreglass filter. The precipitate on the filter was washed with a small amount of water and dried for 24 h at 50° C. The dry precipitate constituted 0.11% by weight of the original filtrate. The precipitate was amorphous, and the main component was Fe with a concentration of over 10% as deduced by semiquantitative XRF analysis. The liquid portion was neutralized from pH 2.05 to 8.9 with lime. A precipitate with a dry weight of 15.57 g was obtained with the following concentration of heavy metals: Cd 3.1 ppm, Cu 130 ppm, Ni 25 ppm, Pb<10 ppm and Zn 1700 ppm.

EXAMPLE 2.

A 15 g amount of dry $FePO_4$ cake (24% Fe, 12% P, 0.0048% Cr) was mixed with 560 g of water. The pH of the suspension was raised from 2.4 to 12 by adding 25.96 g of NaOH (50%). The temperature was maintained all the time (2 h) at 50° C. The solution was then passed through a filter and the precipitate was washed three times with 20 ml of water. The amount of dry precipitate (ferric hydroxide) was 7.2 g and it had the following analysis: 50% Fe, 2.2% P, 0.011% Cr. Based on this analysis the yield of Fe was 100%. A sub-sample of 3.26 g of the filtrate (40.5 g) was taken and diluted with 50 ml water and this was analyzed to contain <0.0015% Fe, 2.6% P and <0.0015% Cr.

The above filtrate was maintained for several days at about +10° C. whereupon yellow crystallites were formed. The crystals (3.97 g) were separated from the solution and they were analyzed by XRD. The crystals were pure $Na_3PO_4$ (<0.0025% Fe, 10.70% Na). The filtrate contained Na 5.4%, P 1.80% and Cr <0.0001%.

The ferric hydroxide precipitate was further treated with NaOH to remove phosphorus remaining in the precipitate. A 2.4 g amount of the precipitate was gradually added to 9.6 g of water containing 0.105 g NaOH (100%). The pH of the solution rose to 12.7. The temperature of the batch was maintained at 50° C. for 2 h. The solution was then filtered giving 2.28 g of precipitate with 48.3% Fe and 1.60% P.

I claim:

1. A method for treating waste water sludge comprising at least one metal originating from a waste water treatment coagulant, and phosphorus and heavy metals in order to recover said at least one metal and phosphorus and to discharge said heavy metals, wherein said at least one metal comprises either iron or iron and aluminum and wherein said waste water sludge is acidified to dissolve metals contained in the sludge thereby yielding an acidified sludge solution containing at least 1% by weight of at least one metal to be recovered, characterized in that the method comprises:

a first precipitation stage comprising raising the pH of the acidified sludge solution and, if necessary, adding phosphate to precipitate at least one metal to be recovered as a phosphate, the molar ratio of the metal or metals to be recovered to phosphate being about 1:1 in this first precipitation stage, and thereafter separating the phosphate precipitate, thereby leaving a solution comprising heavy metals, raising the pH of the solution comprising heavy metals to precipitate a further portion of at least one metal to be recovered as a phosphate, and thereafter separating the further portion of at least one metal to be recovered as a phosphate from the solution and introducing the further portion of at least one metal to be recovered as a phosphate into the dissolution stage, wherein the waste water sludge is acidified, and a second precipitation stage comprising raising the pH of said solution comprising heavy metals and, if necessary, adding an appropriate chemical to precipitate heavy metals, and thereafter discharging the precipitate.

2. A method of claim 1, characterized in that the waste water sludge prior to the first precipitation stage is treated with an oxidizer to convert divalent iron to trivalent iron.

3. The method of claim 2, wherein the oxidizer comprises hydrogen peroxide.

4. A method of claim 1, characterized in that the molar ratio of the metal or metals to be recovered to phosphate is adjusted to about 1:1 prior to the first precipitation stage by adding phosphoric acid to the dissolution stage, wherein the waste water sludge is acidified.

5. A method of claim 1, characterized in that the molar ratio of the metal or metals to be recovered to phosphate is adjusted to about 1:1 prior to or during the first precipitation stage by adding a phosphate solution.

6. A method of claim 1, characterized in that in the first precipitation stage the pH is raised to a level of about 2 to 3 to precipitate ferric phosphate.

7. A method of claim 6, characterized in that the ferric phosphate precipitate separated in the first precipitation stage is treated with an alkali hydroxide thereby forming insoluble ferric hydroxide and a solution comprising soluble alkali phosphate, whereafter the ferric hydroxide is separated.

8. A method of claim 7, characterized in that the separated ferric hydroxide optionally after a treatment with an alkali is dissolved in hydrochloric acid to yield a ferric chloride solution, in sulphuric acid to yield to yield a ferric sulphate solution, or in nitric acid to yield a ferric nitrate solution, wherein said ferric chloride, ferric sulphate, and ferric nitrate solutions are useful as coagulant chemicals.

9. A method of claim 7, characterized in that said solution comprising soluble alkali phosphate is subjected to a treatment to precipitate alkali phosphate, whereafter the precipitated alkali phosphate is separated, thereby leaving a solution comprising phosphate.

10. A method of claim 9, characterized in that said solution comprising phosphate is used to adjust the molar ratio of the metal or metals to be recovered to phosphate prior to or during the first precipitation stage.

11. The method of claim 7, wherein the alkali hydroxide comprises sodium hydroxide.

12. A method of claim 1, characterized in that in the first precipitation stage the pH is raised to a level of about 3 to 4 to precipitate ferric and aluminium phosphates.

13. A method of claim 12, characterized in that the ferric and aluminum phosphate precipitate separated in the first precipitation stage is treated with an alkali hydroxide, thereby forming insoluble ferric hydroxide and a solution comprising soluble alkali phosphate and aluminum hydroxide, whereafter the ferric hydroxide is separated.

14. A method of claim 13, characterized in that an alkaline earth metal hydroxide is added to said solution comprising soluble alkali phosphate and aluminum hydroxide to precipitate an alkaline earth metal phosphate complex, whereafter the precipitate is separated thereby leaving a solution comprising an alkali aluminate.

15. A method of claim 14, characterized in that an acid is added to said solution comprising alkali aluminate to lower the pH to a level at which aluminum hydroxide precipitates, whereafter the precipitate is separated.

16. The method of claim 15, wherein said acid comprise sulphuric acid, and the pH level at which aluminum hydroxide precipitates is between about 7–8.

17. The method of claim 14, wherein the alkaline earth metal hydroxide comprises calcium hydroxide, and the earth metal phosphate complex comprises $Ca_5(OH)(PO_4)_3$.

18. The method of claim 13, wherein the alkali hydroxide comprises sodium hydroxide.

19. A method of claim 1, characterized in that the second precipitation stage is carried out at a pH of about 7 to 9 in the presence of a heavy metal binder.

20. The method of claim 19, wherein said heavy metal binder comprises hydrogen sulphide, or a sulphide comprising sodium sulphide, sodium hydrogen sulphide, or ferrous sulphide.

21. A method of claim 1, characterized in that said waste water sludge comprises metal sludge obtained by subjecting waste water sludge from a waste water treatment plant to acid treatment followed by precipitation and separation of metal sludge from the filtrate.

* * * * *